UNITED STATES PATENT OFFICE.

THEODORE F. COLIN, OF ELIZABETH, NEW JERSEY.

PROCESS OF DESULFURIZING PETROLEUM-OILS.

SPECIFICATION forming part of Letters Patent No. 685,907, dated November 5, 1901.

Application filed January 5, 1899. Serial No. 701,303. (No specimens.)

*To all whom it may concern:*

Be it known that I, THEODORE F. COLIN, a citizen of the United States, residing at Elizabeth, in the county of Union and State of New Jersey, have invented certain new and useful Improvements in Processes of Desulfurizing Petroleum-Oils, of which the following is a specification.

The invention the subject of my present application is an improved process of refining petroleum-oils such as are obtained in Ohio and Indiana and which cannot be reduced to marketable condition by the ordinary processes of refining. These oils have an offensive odor and contain sulfur in some as yet unknown combinations which are not readily nor effectively broken up by the reagents ordinarily employed for eliminating sulfur, and it has heretofore been found necessary to subject them to the action of heat, as well as that of chemical reagents, in order to bring the molecules of the foreign compounds into a more labile condition and render their disassociation practicable. The most effective of the processes now followed in refining such oils involve the treatment of the petroleum during its distillation with suitable chemical reagents. I have found that the same results can be obtained without the application of heat and that by treating the distillate with a chemical agent which has a decomposing effect upon it the molecules of the oil are brought into an unstable condition, in which other proper reagents can act upon the sulfur and eliminate it. I use as such primary decomposing agent sulfuric acid. The proportion to be applied will vary with the specific gravity of the distillate, but need not be in any case in excess of that which is ordinarily employed in refining petroleum and which is usually from six to seven per cent., by weight, of the oil. The strength of the acid also need be no greater than that generally used in the treatment of petroleum. As a secondary reagent I may use any metal which has a sufficient affinity for sulfur—such as copper or lead or a metallic oxid or other metallic salt or compound which disassociates with sufficient readiness under the special conditions which may exist in any given case, permitting its metallic constituent to combine with the sulfur. I have, in fact, used various metals and their oxids, mainly those which yield a sulfid insoluble in dilute acid, such as copper and lead, though I have also used iron, but with less satisfactory results, as this latter metal has less affinity for sulfur than the former and is subsequently separated with greater difficulty. For practical reasons, however, I prefer to use in lieu of the metals named the oxids of the same and particularly the oxid of copper, (CuO,) as this latter appears to yield the best results and is more readily reclaimed.

By the term referred to in the claims of "some form of metal" is meant a metal, its oxid, hydroxid, or salt which can dissolve in sulfuric acid, all of which act in the same way for the present purpose.

My invention is based upon the results of experiments with and observations of the actions of the chemical agents above referred to upon the oils in question, which may be stated as follows: When to a petroleum distillate there is added a given quantity of sulfuric acid, certain complicated reactions take place. The more complex molecules of the oil, which contain oxygen, nitrogen, and sulfur, appear to be broken up and an evolution of sulfurous acid ($SO_2$) will be observed. Sulfuric acid alone, however, does not fully destroy all sulfur-bearing molecules; but if at any stage of the reaction there is introduced a reagent such as a metal or a metallic oxid which has an affinity for sulfur the reaction will be facilitated and directed in a way to secure the most useful practical results in the elimination of sulfur from the oil.

There will be, of course, when the oil is treated with an acid, such as sulfuric acid, and a reagent—viz., a metal or metallic compound which has an affinity for sulfur, as above described—undesirable by - products formed. The acid will act to some extent upon the metal or oxid and produce a sulfate; but I have found that this action is very limited, owing, probably, to the absence of water. Moreover, a portion of the acid goes into combination with the hydrocarbons to form sulfonic acids, which will combine with the metal to form sulfonates, and these must be subsequently broken up to eliminate the metal from the oil. Finally, the metallic sulfid produced is perhaps again broken up by the excess of acid present, as most sulfids are soluble in concentrated acid; but all of these considerations are of minor importance, as the more essential step of separating the sulfur from the oil has been accomplished. The object, therefore, which I seek to accomplish is to mix with the petroleum distillate sulfuric acid and a metal or metallic oxid which has an affinity for sulfur in such manner that by the conjoint or combined action of the two the sulfur compounds in the oil will be broken up and the sulfur fixed to the metal. To accomplish this result, I prefer to proceed as follows: I mix with a distillate about one per cent., by weight, of copper oxid which has been reduced to as finely-divided a condition as practicable until the latter is well suspended in the oil and then add the proper quantity of sulfuric acid, which may be six or seven per cent., by weight, of the oil, although the proportions may be varied within wide limits, keeping the whole mass thoroughly agitated by shaking, stirring, or by means of an air-blast, until the odor of sulfurous acid ($SO_2$) has disappeared. So far as concerns this, the more essential part of the process, the same end may be attained by first treating the distillate with the same proportion of acid until the latter has ceased to act, which may be recognized by the fact that the acid ceases to form a heavy dark sludge, drawing off the sludge, and then without washing treating the acid oil with the oxid. The acid oil in such case still contains sufficient acid in solution or suspension for the necessary action, as above described in connection with the oxid. In this case the acid sludge and the sediment of oxid may be drawn off separately, if so desired, for any further use or for regeneration. In either event when the reaction has continued until the odor of sulfurous acid has disappeared the oil is allowed to settle for some little time, after which the heavier portions at the bottom, containing acid and metallic compounds of oxygen and sulfur, are drawn off. This treatment can be carried out in one operation by using a sufficient quantity of acid and oxid or in two or more successive operations by using smaller quantities of the acid and oxid each time, as will be found most convenient. If the distillate contain any considerable proportion of water, it is desirable to treat it with a small quantity of acid first in order to dry it and then subject it to the treatment above described for the removal of sulfur. After separating the sludge, containing some acid and the metallic compounds, I again mix a small quantity of oxid with the oil in order to neutralize any remaining free acid and to convert into neutral or basic salts the acid sulfonates present. The oil is again allowed to stand for a time, and the heavier residue is then drawn off. It is not necessary to wait for the oil to clear completely, as any floating metallic compounds will be washed out by subsequent treatment. The sediment may be pressed in order to recover mechanically what oil it contains.

The oil after having undergone the above treatment is moderately clear, but it must next be treated for the purpose of breaking up the metallic sulfonates which it contains and which impart to it a dark color. This I accomplish by the use of either hydrogen sulfid, whether as a gas or in its aqueous solution, or by the alkaline sulfids, where the metallic sulfids produced are insoluble in both. The latter, however, I cannot employ in the case of those metallic sulfids which are soluble in alkalies—as, for instance, antimony sulfid. For practical reasons I prefer hydrogen-sulfid water where it can be used, as it acts quickly, the products settle out well, and they do not become contaminated with foreign matter, which would render their regeneration more difficult.

When the oil is stirred up well with hydrogen-sulfid water, the metallic sulfonates are decomposed and a metallic sulfid quickly precipitated, leaving a clear white oil on top. The sediment is drawn off, the oil in it pressed out, and the dry sulfid roasted and reconverted into an oxid. The hydrogen sulfid for this purpose may be conveniently obtained by heating sulfur with some heavy residue from petroleum distillation.

Instead of treating the oil with hydrogen sulfid the same end may be attained by heating it to about 100° centigrade, or even less, for some time, by which means the sulfonates are broken up and the metal precipitated as sulfid or oxysulfid, which separates easily; but for practical reasons I prefer not to heat the oil.

The further treatment of the oil involves only such processes or steps as are well known. The free sulfonic acids produced by the action of hydrogen sulfid upon the copper sulfonates are neutralized with some alkali and then washed out. I would state, however, that for such alkaline reagent I prefer to use lime in the form of milk of lime or lime-water, as soda in the presence of free hydrogen sulfid forms sodium hydrosulfid, (NaHS,) which seems sometimes to reproduce hydrocarbon sulfids, which color the oil.

Having now described my invention, what I claim is—

1. The process of desulfurizing petroleum of the Ohio class herein described, which consists in mixing with the distillate concentrated sulfuric acid and some form of a metal, in a dry condition, which has a strong affinity for sulfur, and of which the sulfid is insoluble in the acid, so that the distillate will be subjected to the simultaneous action of the acid and said agent, as set forth.

2. The process of treating petroleum of the Ohio class herein described, which consists in mixing with the distillate, so that they may act simultaneously on the same, sulfuric acid and some form of metal, as defined, in a dry condition, which has a strong affinity for sulfur, and of which the sulfid is insoluble in the acid, separating the sludge and treating the distillate with a reagent to precipitate the metal in solution therein, as set forth.

3. The process of treating petroleum herein described, which consists in mixing with the distillate so that they may act simultaneously on the same, sulfuric acid and copper oxid, separating the sludge and precipitating the metal in solution, washing out the free sulfonic acids and finishing with alkali and water.

4. The process of desulfurizing petroleum herein described, which consists in mixing with the oil or distillate sulfuric acid and the oxid of a metal, which gives a sulfid insoluble in the mixture of oil and acid.

THEO. F. COLIN.

Witnesses:
M. LAWSON DYER,
BENJAMIN MILLER.